United States Patent Office 3,374,013
Patented Mar. 19, 1968

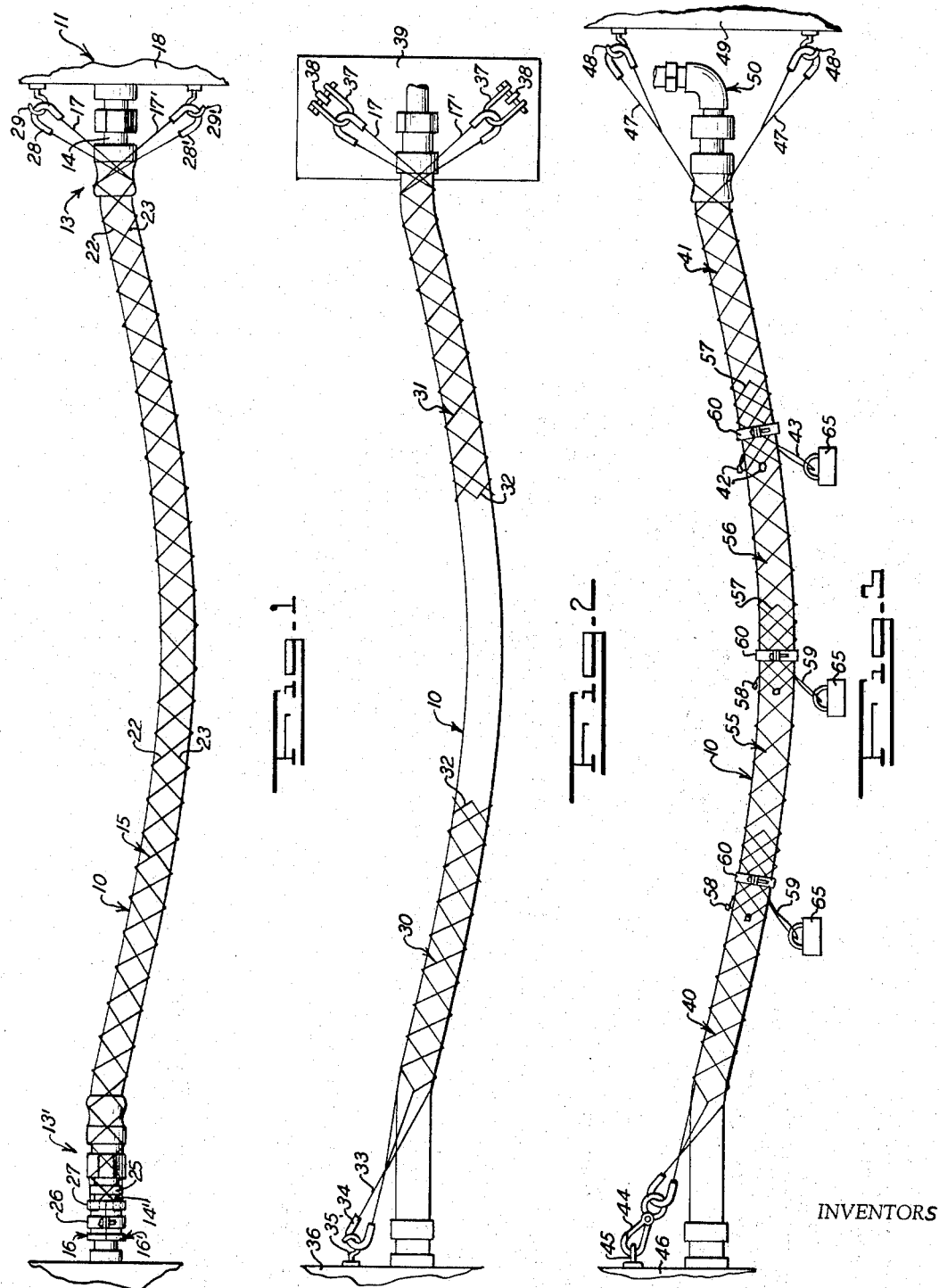

3,374,013
HOSE CONTAINMENT DEVICE
Albert L. Clay, Mystic, and Alfred W. Fidrych, Stonington, Conn., assignors to The Kellems Company, Incorporated, Stonington, Conn., a corporation of Connecticut
Filed Sept. 25, 1964, Ser. No. 399,214
4 Claims. (Cl. 285—114)

This invention relates to a device to be applied to a hose employed in passing from one place to another a fluid which is of such nature that it is inherently dangerous, or which is under such pressure that it would become dangerous if failure of the hose occurred.

The invention is particularly advantageous for use with hose conducting fluids that are subject to variable conditions of temperature and pressure as they are pumped through the hose. It has been found that in certain installations involving the use of air, the pressure of the air transmitted through a hose may vary from zero to six thousand pounds per square inch, and the temperatures may vary from −65° F. to 120° F. Although the hose and the couplings therefore are usually especially designed to operate under such variable conditions, the latter are so severe that even so the life of the hose and couples are relatively short and uncertain. There is always present also the possibility of failure due to faults in the constructions of the hose and couplings, the additional strains which may be imposed on the hose and couplings by the particular path through which the fluid is to be pumped, the danger of abuse of the hose and couplings by external factors such as the connection being broken by a vehicle starting up, or by being run over by a vehicle, or even by being perforated or ruptured by articles such as bullets, sharp articles, etc. Whatever the reason for a failure of such a hose, when such failure does occur, the hose acts as a lethal weapon and may cause serious injury or death to those persons within its reach, and extensive damage to equipment with which it comes in contact.

It is the principal purpose of this invention to provide a control for the hose so that even though it may fail for any reason whatsoever, it will be prevented from damaging personnel or equipment.

Another object of the invention is to provide an improved device which will reduce the possibilities of failure of the hose and its connections, both due to the stresses and strains they will be subject to while performing their normal functions, and to any abuse they may be subject to externally while being used.

Still another object of the invention is to provide an improved device which is capable of substantially reducing the possible detrimental effects excessive pressures may have on the construction of a hose, and the possible aggravation of any inherent faults in the hose by such excess pressures.

A further object of the invention is to provide an improved safety device which is capable of enhancing the operating characteristics of the hose by providing additional support to the hose throughout its length while in usage.

Other objects of the invention, as well as its advantages, will become apparent from a perusal of the following description, when read in connection with the accompanying drawings, in which FIG. 1 is a side elevational view showing a hose connection provided with the device of this invention;

FIG. 2 is a similar view showing another embodiment of this invention; and

FIG. 3 is a similar view showing still another embodiment of the invention.

In the drawings the reference numeral 10 indicates generally a hose that may be specially constructed to conduct a particular fluid or type of fluid. In the drawings the hose is shown utilized for the purpose of delivering air under high pressure from a source 11 of compressed air such as a tank or a compressor provided on a truck, to a place of delivery where it is to be used, such as for example, an airplane where it may be used to start the engines thereof. The hose is provided at its ends with couplings 13, 13' of a known type by which it may be connected in the usual fashion to a supply pipe 14 and a delivery pipe 14', respectively. The hose may have a length of about six feet, or may be substantially greater in length as required by the particular usage to which it is to be put.

In accordance with the invention, the hose 10 shown in FIG. 1 of the drawings, is enclosed throughout its entire length by an open meshed tubular structure 15, one end of which is anchored on a split ring composed of two semi-circular parts 16, 16', and the other end of which is provided with loops 17, 17' by which such structure may be secured to a support 18 at the source 11. The body of the structure 15 is composed of wire strands, one group 22 of which spiral about the central longitudinal axis of the structure in a direction opposite to that of a second group 23 of such strands, the strands in the one group 22 being interwoven or braided with the strands in the second group 23 as they spiral from one end of the body of the structure to the other end thereof in a manner well known to the art. The open mesh structure so formed may be substantially varied in diameter by endwise compression and expansion thereof. Thus, longitudinal compressive forces which would tend to reduce the length of the structure will cause the structure to expand in cross-section, thereby enabling it to be slipped readily over the fitting 13 and hose 10 and when such longitudinal forces are removed, the structure will contract immediately and automatically in a cross-section to cause the strands thereof to engage with the exterior surface of the hose. When an endwise force is subsequently exerted on the open mesh structure, such as would tend to elongate it, as for example by rupture of the hose, or by failure of a coupling member, the force created on at least one of the ruptured parts by the thus freed high pressure fluid, will cause the structure to reduce its cross-sectional area and thereby cause the wire strands to tighten upon the exterior surfaces of the hose parts and firmly hold them against any unrestrained movements they might otherwise have. Preferably, the normal, relaxed internal diameter of the open mesh structure is slightly smaller than the outside diameter of the hose so that after it has been positioned on the hose it will normally exert a slight gripping action on the exterior surface of the hose. This condition will enable the structure to provide both additional strength and support to the hose during its usage, and immediate restraint to any hose part that may have become loose through failure. It will be noted from FIG. 1 of the drawings that the open meshed structure may be employed to embrace the coupling members 13, 13' thereof as well as the main body of the hose for the purposes of the invention. To facilitate the enclosure of the couplings, the wires of the open meshed structure may be woven in what is termed in the art a "low angle weave," either in those portions of the structure which are to enclose the couplings, or throughout the length of the structure.

The split ring composed of the semi-circular members 16, 16' is a rigid, metallic, annular ring having an inner diameter such that it readily fits on the delivery pipe 14' in back of a collar 25 which may be suitably secured to, or integral with pipe 14', and which maintains the split ring in position on such delivery pipe. The split ring is provided between its ends with an annular groove in which is positioned a fastening band or strap 26 for securing the two parts 16, 16' of the split ring to the delivery pipe 14'. The inner annular end or flange 27 formed on the ring by said annular groove is provided with a plurality of circularly arranged spaced apertures through which extend the wires forming the open mesh structure 15. The wire strands extending through these apertures may be equal in number to the number of apertures, or may be one-half the number of apertures in which case a pair of strands 22, 23 will form part of an integral strand whose intermediate portion will be threaded through two of the said apertures. The ring members 16, 16' in such construction will be in effect woven into the open mesh structure 15 to form an integral part thereof.

The end loops 17, 17' are formed by separating the ends of the strands 22, 23 into two groups and forming each loop with one of such groups. Each loop is preferably provided with a draft head 28, 28' in the form of a bent, metal tube. The diametrically disposed loops 17, 17' are hooked onto fastener devices 29, 29' of any suitable construction and permanently mounted onto the face of the support 18. The fastener devices or hooks 29, 29' may be vertically disposed, as shown in FIG. 1, or may be horizontally disposed as indicated by the right hand end of the open mesh structure shown in FIG. 2 of the drawings.

It will be understood from the foregoing, that when the air hose 10 is coupled by its coupling members 13, 13' to the supply and delivery pipes 14, 14', respectively, the split ring members 16, 16' are secured in position on the delivery pipe 14' by the band 26, and the loops 17, 17' are secured to the support 18 by means of the fastening devices 29, 29', compressed air may be supplied through the hose 10 with perfect safety. As the air being supplied by the pump, the hose will pulsate, increasing in diameter at the higher pressures and returning to normal diameter at the lower pressures and at the same time changing its lengthwise configurations. With such changes the grip of the open mesh structure on the hose will also change, the structure automatically exercising a tighter grip on the hose with increased distortions in the hose configurations because of the increased pressures. The device therefore will automatically vary its support of the hose in direct proportion to the operating characteristics of the hose under the varying conditions of its operation. If in the use of the hose there should occur a failure in either the body or coupled ends thereof for any of the reasons previously mentioned, the force exercised by a loosened hose part at such failure under the pressure of the air, will automatically and immediately cause the open mesh structure to secure a firm grip on such loosened part. The device also will almost immediately extend to its maximum length under the conditions of the particular installation, and because it is fixed at its ends to immovable parts, will become in effect a rigid, non-stretchable casing about the hose parts and prevent any movement of the same substantially beyond their normal range of movement in the operation of the hose in such installation. Thus, broken portions of the hose are prevented from whipping or flying through the air and the safety of personnel and nearly equipment is assured.

The advantages of the invention may be obtained with a single length of open mesh structure such as shown in FIG. 1 of the drawings, or with two lengths of such structure such as shown in FIG. 2 of the drawings, or with a plurality of equal length, overlapping sections of such structure, such as shown in FIG. 3 of the drawings. In the embodimnet shown in FIG. 2 of the drawings, the device is composed of two sections 30 and 31 of open mesh wire structure, each of which has a length approximately equal to one-third the length of the hose 10 so that when such sections are mounted on the ends of the hose, the central portion of the hose, approximating one-third the length of the hose, is not enclosed by the device. It has been found however, that such enclosure of the hose by the device of this invention is sufficient to accomplish the purposes for which the device was devised.

Each of the open mesh sections 30, 31 of the device is composed of wires interwoven about a common axis in the manner above described with respect to the open mesh structure 15 to provide agripping body for the hose. In such construction, it is preferred that the strands spiralling in opposite directions be formed from single pieces of wire bent intermediate their ends to form continuous loops 32 at the open ends of mesh sections. The ends of the strands may be grouped and constructed to form the previously described loops 17, 17', or secured to a split ring in the manner previously described with respect to the split ring sections 16, 16', or such ends may all be grouped together to form a single offset loop such as the loop 33 shown formed on the open mesh section 30 in FIG. 2 of the drawings. The loop 33 is preferably provided with a metal tube or sleeve forming a draft head 34 and may be connected by any suitable fastening device 35 to a fixed support 36 at the place of delivery of the compressed air. In the embodiment of FIG. 2, the loops 17, 17' are shown connected by suitable shackle bolts 37 to rings 38 secured to the tailgate 39 of a truck equipped with an air compressor or other source of air supply. For purposes of clearness, in FIG. 2 of the drawings the right hand end of the hose and associated parts are shown rotated through 90° so that such parts are in effect shown in top plan view.

In the embodiment of the invention shown in FIG. 3 of the drawings, the open mesh portions of the two end sections 40 and 41 of the device are constructed substantially similar to the sections 30, 31, respectively, shown in FIG. 2 of the drawings, but are materially shorter than the latter. Section 40 is similar to section 30, but section 41 differs from section 31 in the respects that the free ends of certain of the strands at the open end of the section are bound togther in pairs by a plurality of clips 42, and a loop 43 is formed with the free ends of others of such free strand ends. The section 40 may be constructed to be secured at the delivery end of the hose in accordance with either of the previously discussed methods of securement, or as shown in FIG. 3, may be connected by a safety snap hook 44 to a ring 45 secured to the fixed support 46. The fastening loops 47 of the end section 41 are connected in the manner of the loops 17, 17' in FIG. 1, to fastening devices 48 secured to a fixed support 49 located behind the pipe members 50 through which the compressed air is supplied to the hose 10.

The open mesh sections 55 and 56 connecting the opposed ends of the end sections 40, 41 are similarly constructed and are each composed of wires interwoven about a common axis in the manner preivously described to provide a gripping body for the hose. The strand sections spiralling in opposite directions through the gripping body are formed from single pieces of wire bent intermediate their ends to form continuous loops 57 at one end of such sections. The free ends of the strands at the other ends of such sections are bound together in pairs by clips 58 and are formed into loops 59 in the manner of the free ends of the strands on the end section 41.

It will be noted in FIG. 3 of the drawings that the adjacent end portions of the open mesh sections 40, 41, 55 and 56 are overlapped, with the ends thereof provided with the loops 43 and 59 overlapping the associated end portions of such sections. The extent of overlap of such portions may be varied to properly fit the mesh sections to the hose so that the latter is snugly and uniformly gripped by the device throughout its length. Even though the end portions of said sections are overlapping, the device will provide a uniform pressure on the hose throughout the length of the open mesh structure constituted of such sections. The overlapping end portions of the sections are secured in such relation by metal clamp bands 60 which are secured tightly in position in any suitable manner. Weights 65 are connected to the loops 43 and 59 to control or dampen any tendency of the hose to whip under the air pressure while the device is in use.

It will be understood from the foregoing that the device of this invention includes an open mesh structure which may be made in one piece or two pieces, or a plurality of sections, and which is of a length to enclose sufficient of the hose to confine those portions thereof which are most likely to become loose under pressure due to failure of the parts thereof, or to damage suffered while in use.

It is also within the contemplation of the invention to use instead of open meshed structures which are woven in closed tubular formation in the manner disclosed in the drawings, the known type of meshed structures which are split longitudinally in order that they may be more readily used in applications where the disclosed open meshed structures will not fit, as on certain types of hose end fittings, and which, as is well known in the art, may be closed with lacing, fastener members, or pins, as shown in U.S. Patent Nos. 832,401 dated Oct. 2, 1906; 1,769,479 dated July 1, 1930 and 2,602,207 dated July 8, 1952. The device of this invention further includes at the two ends of such structure means for securing the structure between fixed members such as the tailgate of a truck, a fixed support, the fluid supply or delivery means, etc., so that the structure when in stretched condition due to failure of any part of the hose, will restrain any tendency of a loosened part of the hose to move substantially away from its normal position in the operation of the hose. Due to the construction of the open mesh structure, and its initial gripping action on the hose, it will strengthen the hose during its functions, will reduce the likelihood of a failure thereof, and will immediately restrain any part thereof becoming loose through failure or damage, against movements likely to cause damage or injury to personnel or property. When the open mesh structure is made in a plurality of sections, it is preferred that the sections be of a given length to enable any given number thereof to fit the longest lengths of hose approximating the overall length of such given number. Thus, when shorter lengths of hose within the range of sizes capable of being covered by such given number of sections is to be protected, such shorter lengths of hose can be readily taken care of by varying the amount of overlap of such sections.

While I have described and illustrated several embodiments in which my invention may be practiced, it will be apparent to those skilled in the art that further changes may be made without departing from the spirit of the invention, or the scope of the appended claims.

What is claimed is:

1. The combination of a supply pipe for fluid under high pressure, a delivery pipe spaced from said supply pipe, a length of hose provided at its two ends with coupling members and coupled at one end to said supply pipe and coupled at its other end to said delivery pipe, and hose containment means for safety containing said hose in the event of failure thereof or failure of either of said coupling joints, said hose containment means being separate from the hose and permitting the hose to flex substantially normally, and including elongated woven structure means composed of strands interwoven in open mesh fashion and mounted in surrounding relation on said entire length of hose, the outer hose gripping end portions of said woven structure means being located on the end portions of said hose inwardly of said coupling joints, a support associated with and located outwardly of each of said coupling joints and being fixed with relation to the pipe associated with such joint, and means securely connecting said outer end portions of said woven structure means to said supports, said connecting means extending from said end portions in by-passing relation to and independently of the coupling joints to directly connect the outer ends of said woven structure means to said supports, thereby eliminating abnormal stress on the coupling joints.

2. The combination claimed in claim 1, in which at least one of said supports comprises an interengageable anchoring member located in offset spaced relation to its associated pipe, and in which said connecting means connected to said one support comprises an interengageable anchoring member interengaged with said support anchoring member.

3. The combination claimed in claim 1, in which at least one of said supports comprises a plurality of interengageable anchoring members located in offset spaced relation to its associated pipe, and in which said connecting means connected to said one support comprises a plurality of interengageable anchoring members interengaged with said support anchoring members.

4. The combination claimed in claim 1, in which said elongated woven structure means is composed of a plurality of adjoining sections each having a length substantially less than the length of the hose, the adjoining ends of said sections being in overlapping relation, and means encircling the overlapped portions of said sections and securing the same in such relation on the hose.

References Cited

UNITED STATES PATENTS

| | | | |
|---|---|---|---|
| 2,813,730 | 11/1957 | Courtot | 285—305 |
| 1,558,878 | 10/1925 | Hitchcock | 285—114 |
| 3,291,507 | 12/1966 | Clay | 285—305 X |
| 770,982 | 9/1904 | Plassman | 285—114 |
| 832,401 | 10/1906 | Martin | 24—123 |
| 1,651,022 | 11/1927 | Fulton | 285—114 |
| 1,675,391 | 7/1928 | Stockbridge | 174—42 |
| 2,316,855 | 4/1943 | De Gravelle | 285—114 |
| 2,444,988 | 7/1948 | Guarnaschell | 285—114 |
| 2,662,552 | 12/1953 | Rowe et al. | 138—178 |
| 2,740,178 | 4/1956 | Kellems | 24—123.5 |
| 2,750,210 | 6/1956 | Trogdon et al. | 24—123.5 |

CARL W. TOMLIN, *Primary Examiner.*

RICHARD G. BERKLEY, *Assistant Examiner.*